US012063193B2

(12) United States Patent
Thomas et al.

(10) Patent No.: US 12,063,193 B2
(45) Date of Patent: Aug. 13, 2024

(54) TRANSFER OF AI-POWERED CONVERSATIONAL MESSAGING WITHIN A MOBILE APPLICATION

(71) Applicant: Bank of America Corporation, Charlotte, NC (US)

(72) Inventors: Prejish Thomas, Plano, TX (US); Priyank R. Shah, Plano, TX (US); Ravisha Andar, Plano, TX (US); Ramakrishna R. Yannam, The Colony, TX (US)

(73) Assignee: Bank of America Corporation, Charlotte, NC (US)

( * ) Notice: Subject to any disclaimer, the term of this patent is extended or adjusted under 35 U.S.C. 154(b) by 346 days.

(21) Appl. No.: 17/750,496

(22) Filed: May 23, 2022

(65) Prior Publication Data

US 2023/0379282 A1    Nov. 23, 2023

(51) Int. Cl.
| | |
|---|---|
| *H04L 51/216* | (2022.01) |
| *G06F 3/0482* | (2013.01) |
| *G06N 3/09* | (2023.01) |
| *H04L 51/02* | (2022.01) |
| *H04L 51/58* | (2022.01) |
| *H04M 1/72436* | (2021.01) |

(52) U.S. Cl.
CPC .......... *H04L 51/216* (2022.05); *G06F 3/0482* (2013.01); *G06N 3/09* (2023.01); *H04L 51/02* (2013.01); *H04L 51/58* (2022.05); *H04M 1/72436* (2021.01)

(58) Field of Classification Search
CPC ....... H04L 51/216; H04L 51/02; H04L 51/58; H04L 51/066; G06F 3/0482; G06F 3/04842; G06F 3/04886; G06F 3/167; G06N 3/09; G06N 3/04; G06N 3/08; H04M 1/72436

USPC ........................................................ 455/466
See application file for complete search history.

(56) References Cited

U.S. PATENT DOCUMENTS

| | | | |
|---|---|---|---|
| 8,200,527 B1 * | 6/2012 | Thompson | G06Q 30/00 705/7.41 |
| 2004/0249650 A1 * | 12/2004 | Freedman | G06Q 30/0201 705/7.29 |
| 2015/0189085 A1 * | 7/2015 | Riahi | H04M 3/5175 379/265.09 |

* cited by examiner

*Primary Examiner* — Tanmay K Shah
(74) *Attorney, Agent, or Firm* — Weiss & Arons LLP

(57) ABSTRACT

Systems, methods, and apparatus are provided for integrating data from multiple computer-based communication platforms within a single user session at a mobile device application. The mobile device application may interact with a first platform in a first format. The first platform may include an interactive response system such as a chatbot. The mobile device application may receive a request to interact with a live agent and may interact with a second platform in a second format. The second platform may include an agent interface. In response to the transfer request, the first interface may capture the interactions with the first platform, convert the interactions from the first format to the second format, and transmit them to the second platform. The second platform may display the session history to the agent on the same screen as real-time, ongoing agent interactions with the user.

22 Claims, 7 Drawing Sheets

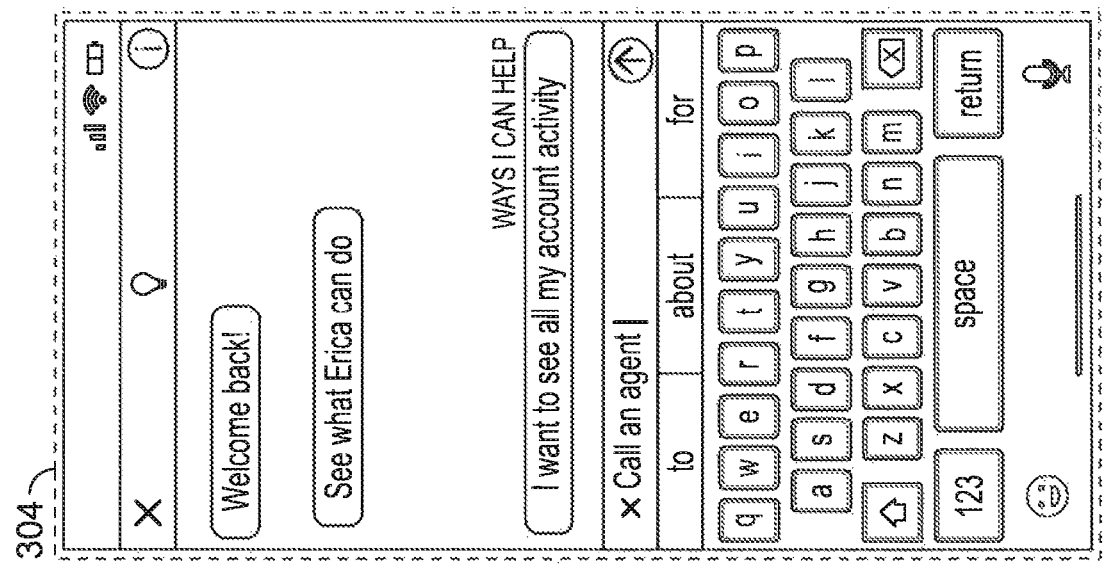
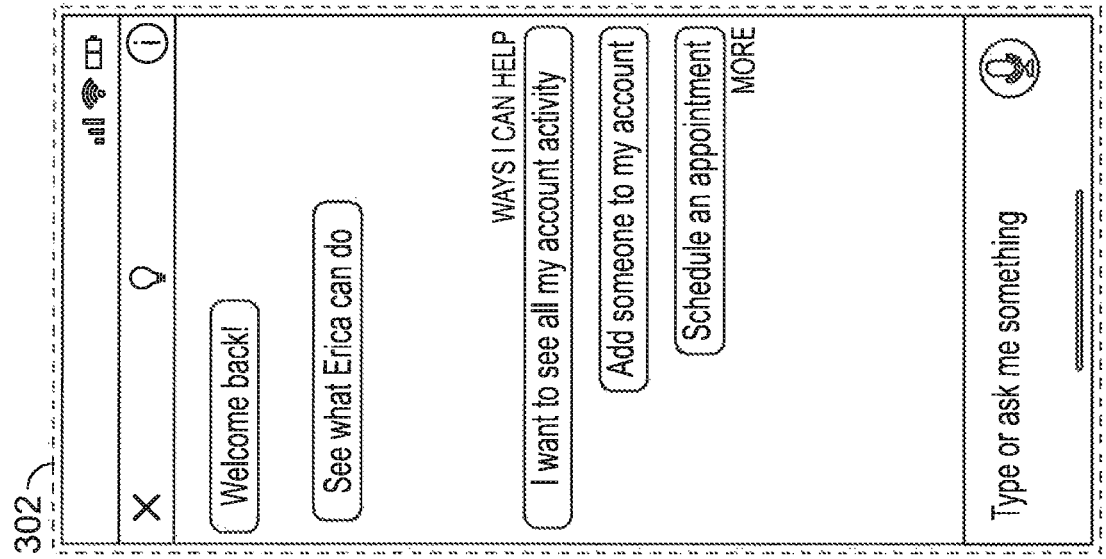
FIG. 3A

FIG. 4

Workspace

JANE SMITH  00:08

Case Information

| | |
|---|---|
| Origin: | Inbound chat |
| Account Number: | |
| Authenticated: | true |
| BAC app version: | 22.03.0.306a |
| Caller Intent: | TRANSFER_HELP |
| Chat ID: | 00056aGWT9VT0156 |
| Client Chat Window | Open |
| Device Type: | GOOGLE |
| Device Type OS Version | Android 1.2 |

▼ JANE SMITH  Connected

[10:12:23 AM] JANE: New party 'JANE' has joined the session
[10:12:24 AM] system: Your chat may be recorded and monitored for quality purposes.
[10:12:24 AM] John Doe: New party 'John Doe' has joined the session
[10:12:24 AM] JANE:

***********Client conversation with Erica started***********
Client: I have a question about my transfer
Erica: It sounds like you may want help with one of these options.
Client: Did my transfer process
Erica: Here's a list of popular transaction types.
Client: How much was my last transfer
Erica: I didn't understand that. Here's a list of popular transaction types.
Client: Call about a transfer
Erica: I can help with these things right now or I can connect you with someone.
Client: Chat live
Erica: A specialist will be here soon.
***********Client conversation with Erica ended***********

⊙☐ CO-BROWSE    ☐ WEB ACTIVITY    ☐ CONTACT    ☐ RESPONSES

Send

Dispositions

Quick Search
Client disconnected chat prior resolution
Client request requires transfer - Provided 800#

— 402
— 404

TRANSFER OF AI-POWERED CONVERSATIONAL MESSAGING WITHIN A MOBILE APPLICATION

FIELD OF TECHNOLOGY

Aspects of the disclosure relate to mobile applications for use with mobile devices.

BACKGROUND OF THE DISCLOSURE

An enterprise customer may communicate with the enterprise through a variety of channels. For example, a customer may communicate by telephone, internet-based chat, or chat through a mobile application. In each of these mediums, customer interactions may involve either an interactive response system or a live agent. In some scenarios, a customer may begin a session with an interactive response system and may be transferred to a live agent mid-session.

A customer may sequentially engage with both the interactive response system and the live agent through a single channel. For example, a user may interact with a chatbot in a mobile application and ask for a transfer to a human agent. However, on the back end, the interface for communications with the chatbot may be different from the interface for communications with the agent. As such, the agent may begin interactions with the customer from scratch, by working their way through a standardized response tree. The agent may require the customer to provide information already entered earlier in the session during communications with the chatbot. This lack of coordination may be both frustrating and inefficient.

It would be desirable for an interactive response system to contextualize and personalize next steps for an individual user.

It would further be desirable to integrate data from the different communications platforms that are used for a chatbot and for a live agent. It would be desirable to enable the transfer of a customized chatbot session to a live agent while providing the agent with access to a full session history.

SUMMARY OF THE DISCLOSURE

Systems, methods, and apparatus are provided for integrating data from multiple communication platforms within a user session at a mobile application.

A first platform may interact with a mobile device application. The first platform may include an interactive response system and may interact with the mobile device application in a first format. The interaction may include artificial intelligence (AI) powered prompts as well as user inputs such as selections or responses.

The user may ask to transfer the session to a live agent. In response to the transfer request, the first platform may capture a history of the interaction between the first platform and the mobile device application. The first platform may convert the history from the first format to a second format and transmit the converted history to a second platform.

The second platform may interact with the mobile device application in a second format. The second platform may be an agent interface. The interaction may include agent generated prompts as well as user inputs such as selections or responses.

The second platform may display the history of the interaction between the first platform and the mobile device application to the agent. The history may be displayed on the same screen as the real-time, ongoing, interaction between the second platform and the mobile device application.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which:

FIG. 3A shows a set of illustrative apparatus in accordance with principles of the disclosure;

FIG. 4 shows an illustrative screen view in accordance with principles of the disclosure.

DETAILED DESCRIPTION

Figure 1:
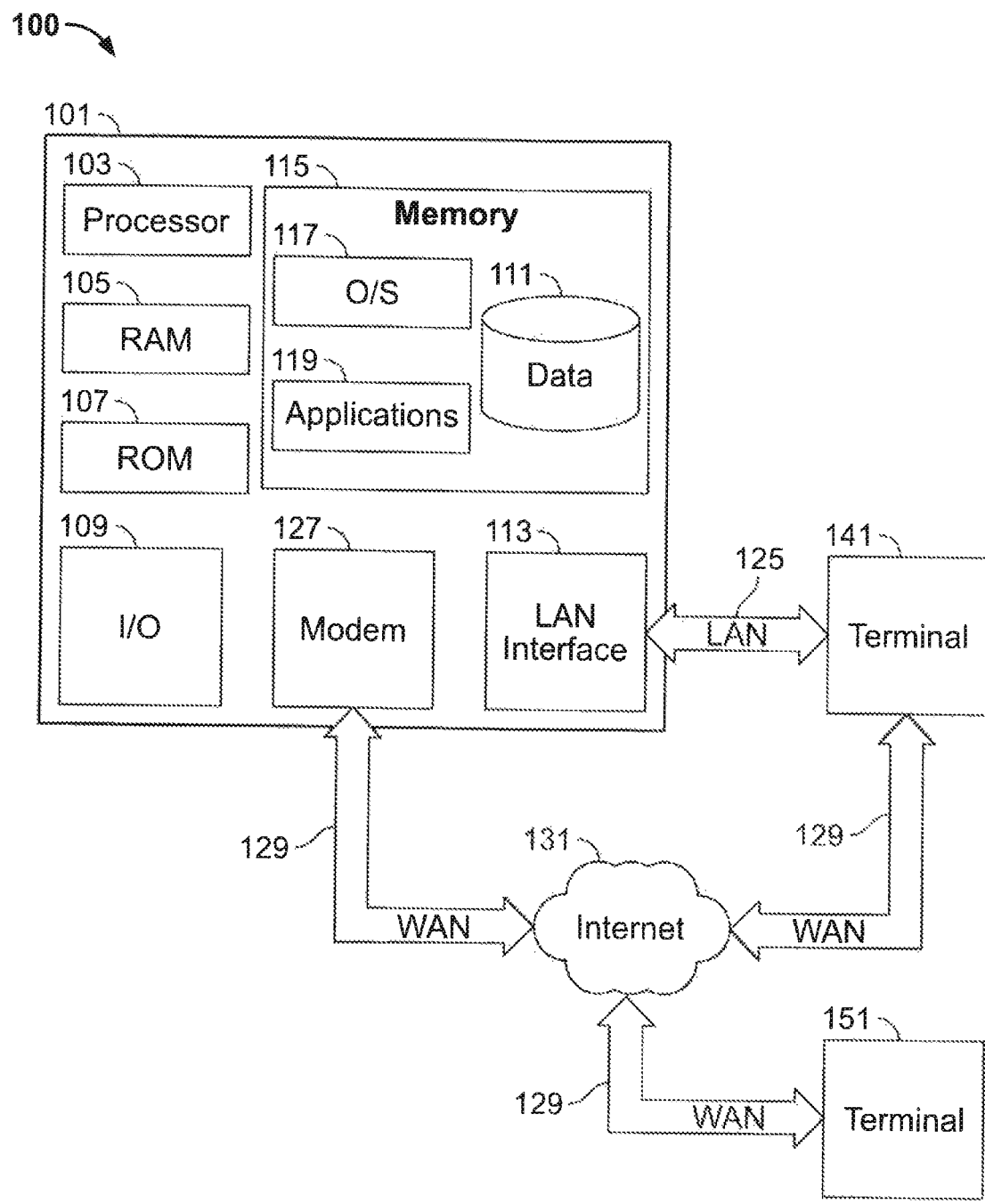
FIG. 1 shows illustrative apparatus in accordance with principles of the disclosure.

Systems, methods, and apparatus for integrating data generated at an AI-powered interactive response system with agent platform are provided.

For the sake of illustration, the invention will be described as being performed by a "system." The system may include one or more features of apparatus and methods that are described herein and/or any other suitable device or approach.

The system may include a first interface for interacting with a user. The first interface may be an interactive response system.

The interactive response system may include a chatbot. Chatbots are software used to automate conversations and interact with humans through various communication platforms. Chatbots may be powered by pre-programmed responses, AI and/or machine learning in order to answer questions without involving a human agent. Chatbots may simulate conversations with a human using text, text-to-speech, or speech-to-speech.

The interactive response system may interact with a user by telephone, using a web page, text message function, or via any suitable method. The interactive response system may interact with a user via a mobile application. The mobile application may incorporate a chat function.

In some embodiments the interaction may be initiated at the first interface in response to a request from the user. In some embodiments, a session with the first interface may be initiated at the mobile device application.

The interactive response system may include an AI-powered communication engine for generating prompts or responses. The system may train the AI-powered communication engine. The system may designate a topic of user interest and retrieve legacy communications regarding the topic. The legacy communications are preferably retrieved from an electronically stored library of communications. In some embodiments, the library of communications may relate to one or more pre-determined users in order to develop a customized AI model for an individual user.

The system may preferably remove duplicative communications from retrieved list of legacy communications. For the purposes of this application, duplicative communications may include any communications that do not introduce any non-cumulative information beyond information already derived from other communications sources.

The system may retrieve legacy intelligence relating to historical user selections regarding the topic. These user selections may include selections made in response to electronic prompting of the user.

The system may retrieve a plurality of outcomes based on the legacy intelligence. The plurality of outcomes may include outcomes associated with historical user selections. The user selections may include the topic of user interest. These outcomes may preferably be tailored to show direct, substantially direct, or indirect results that flowed from the historical user selections.

The system may form a training set for a neural network. In some embodiments, the training set may specifically relate to a topic of user interest. Forming a topic-centric training set for a neural network may include mining information that relates to legacy user communications, legacy intelligence, and the plurality of outcomes as described above. This information can then inform the set of nodes that form the neural network.

The topic-centric training set may, in certain embodiments be delimited by an analysis of a relevant database. The database may include legacy user communications, legacy intelligence, and the plurality of outcomes as described above. An analysis may be performed to obtain, for example, the 100 most common nouns in the database. For these databases, the topic-centric training set may mine all communications and other information related these terms. The method may use the topic-centric training set to form a neural network for each of the 100 most common nouns in the database. In certain embodiments, the topics of interest in the database may be reduced to a suitable pre-determined number of most-occurring topics of interest.

Because the mined information has been derived in a way that is customized to the user, each of the topic-based neural networks may include information that is ranked according to individual usage patterns.

The formation of each neural network may use the topic-centric training set to assign individual weights to each of the plurality of nodes based on the legacy communications, legacy intelligence, and the plurality of outcomes.

In response to a selection by a user of a topic of user interest, the system may generate a plurality of topic-related user options based on the neural network. These options may preferably have been formed with an associated priority score. The system may use the priority to score to rank and display the plurality of user options.

In addition to ranking and displaying options to the user, the system may also prompt the user to select one of the options. The system may prompt the user to select a scenario indicator in which a set of predicted scenarios are displayed.

The system may include a second interface for interacting with a user. The second interface may be an agent interface and may enable communication with a live agent. The agent may interact with the user by telephone, using a web page, text message function, or via any suitable method. The agent may interact with the user via a mobile application. The mobile application may incorporate a chat function.

In some embodiments the interaction may be initiated at the second interface in response to a request from the user. In some embodiments, a session with the second interface may be initiated at the mobile device application.

In some embodiments, communication with a chatbot and communication with a live agent may occur within a single mobile application chat function. Communication with both the chatbot and the live agent may occur within a single chat session. For example, a user may begin interactions with the chatbot. In the course of communication with the chatbot, the user may request a transfer to a live agent. The same chat function may then initiate a live chat with an agent.

The chatbot may interact with the mobile application via the first interface in a first format. The live agent may interact with the mobile application via the second interface in a second format. On the front end, the customer may interact with a chatbot and an agent via the same mobile application chat function.

Conventionally, on the back end, user interactions with a live agent via the second interface may be entirely segregated from the previous interactions with the interactive response system via the first interface. A user might provide account information or ask questions in a chatbot interaction and then be required to provide the same information all over again after transferring to a live agent.

In order to improve the user experience, the system may integrate these different interfaces on the back end. Integrating the history of interactions via the first interface with the interactions via the second interface may provide more seamless customer service.

In response to a request for a live agent, the first interface may capture all session interactions prior to the request. These interactions may be saved in a history interaction table in an enterprise database.

The session history may be retrieved from memory by the first interface. The first interface may convert the interactions from a first format to a second format for compatibility with the second interface. The first interface may transmit the history to the second interface. The second interface may display the history to an agent.

The history may be displayed to the agent on a screen of the agent interface. The history may be integrated into the interface so that the agent may view the history alongside their live chat interactions with the user. The history may be accessed by toggling from a first screen on the agent interface to a second screen.

The session history may be made available for capture for a predefined period of time. The session history may be stored in a database for a predetermined period of time. The session history may be deleted after the predetermined period of time has elapsed. In some embodiments only a predetermined portion of the session history may be stored in the database.

One or more non-transitory computer-readable media storing computer-executable instructions are provided. When executed by a processor on a computer system, the instructions perform a method for integrating data from multiple communication platforms within a single user session at a mobile device application.

The method may include initiating an interaction with a mobile device application at a first platform that includes an interactive response system. The first platform may interact with the mobile device application in a first format.

The method may include receiving a request to transfer the interaction to a live agent. An interaction with the mobile device application may be initiated at a second platform that includes an interface. The second platform may interact with the mobile device in a second format.

The method may include, in response to receiving the request from the user, capturing a history of user interactions with the first interface. The first interface may convert the interactions from the first format to the second format and may transmit them to the second platform for display to the agent.

The method may include displaying the history of interactions with the first platform on the same screen as real-time agent interactions with the user at the second platform.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods. Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server," or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

Memory 115 may be comprised of any suitable permanent storage technology, such as a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks. Application program(s) 119 may utilize one or more decisioning processes for the processing of communications involving AI as detailed herein.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
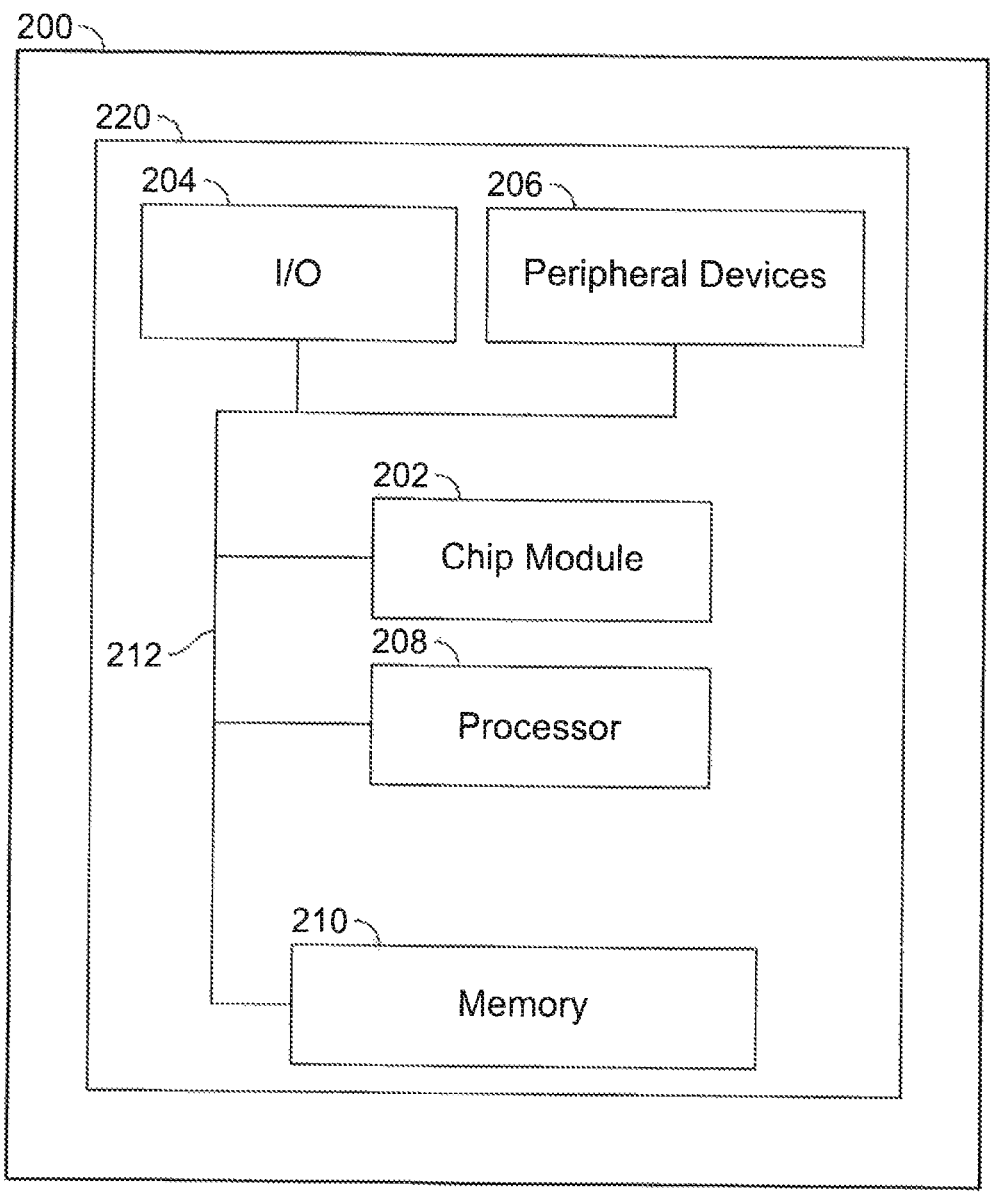
FIG. 2 shows illustrative apparatus in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 219, signals, and/or any other suitable information or data structures.

Components 202, 204, 206, 208, and 210 may be coupled together by a system bus or other interconnections 212 and may be present on one or more circuit boards such as circuit board 220. In some embodiments, the components may be integrated into a single chip. The chip may be silicon-based.

Figure 3B:
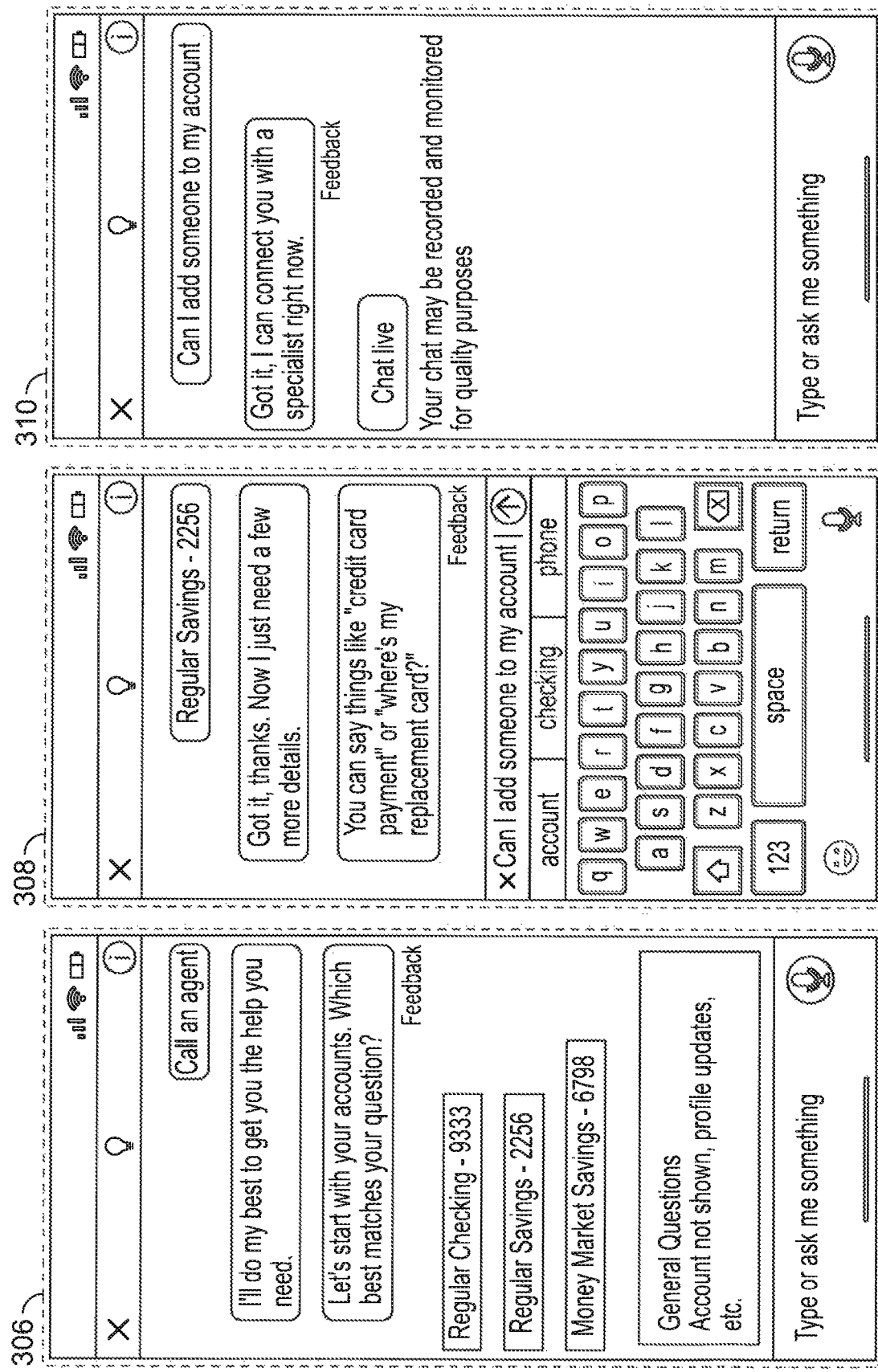
FIG. 3B shows a set of illustrative apparatus in accordance with principles of the disclosure.
Figure 3C:
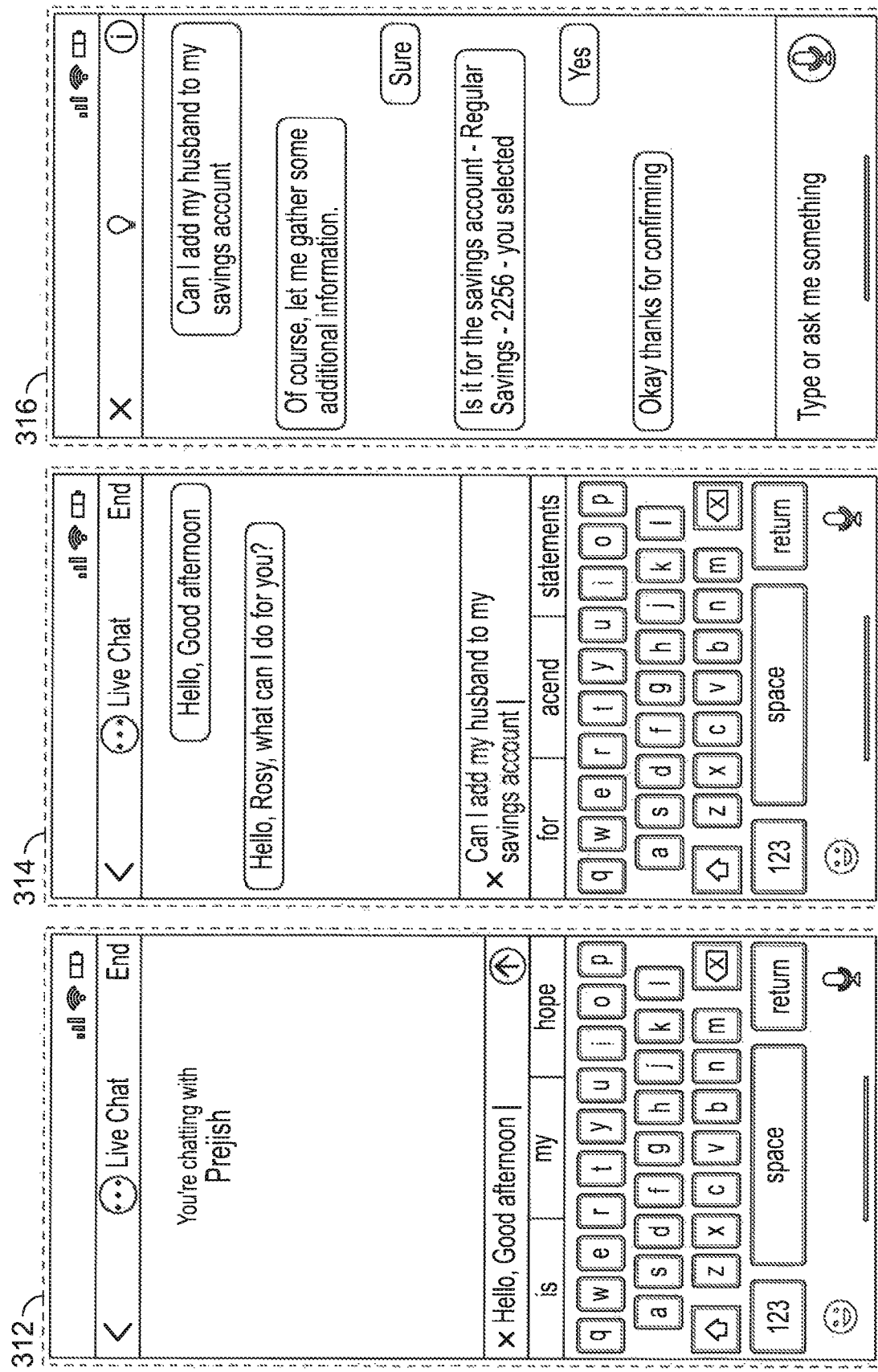
FIG. 3C shows a set of illustrative apparatus in accordance with principles of the disclosure.

FIGS. 3A-3C show illustrative apparatus for use together with systems and methods in accordance with the principles of the disclosure. FIGS. 3A-3C show electronic chat communications at a mobile device application.

In FIG. 3A, at 302, a mobile device screen shows predetermined options presented by a chatbot interface (Erica). At 304, the mobile device screen includes a pop-up virtual keyboard to receive input from a user. In the illustrative view shown at 304, a user has typed in a request to connect with a live agent.

In FIG. 3B, the chatbot presents a series of prompts prior to transferring the connection to an agent. At 306, the mobile device screen shows chatbot prompts for the user to select an account associated with their question. At 308, the mobile device screen shows chatbot prompts for the user to enter a topic of inquiry. At 310, the mobile device screen shows a selectable option for transferring the chat to an agent.

In FIG. 3C, the user interacts with a live agent. At 312, the mobile device screen shows a greeting from the agent. At 314, the mobile device screen shows the user entering a query. At 316, the mobile device screen displays interactions showing that the agent has accessed the earlier inputs to the chatbot and is informed about the selected account.

FIG. 4 shows another illustrative apparatus for use together with systems and methods in accordance with the principles of the disclosure. At 402, an agent screen view is shown. The agent screen includes a display of an ongoing interaction with a mobile device user. At box 404, the agent screen includes a transcript of an earlier portion of the session involving interactions with the chatbot (Erica).

Figure 5:
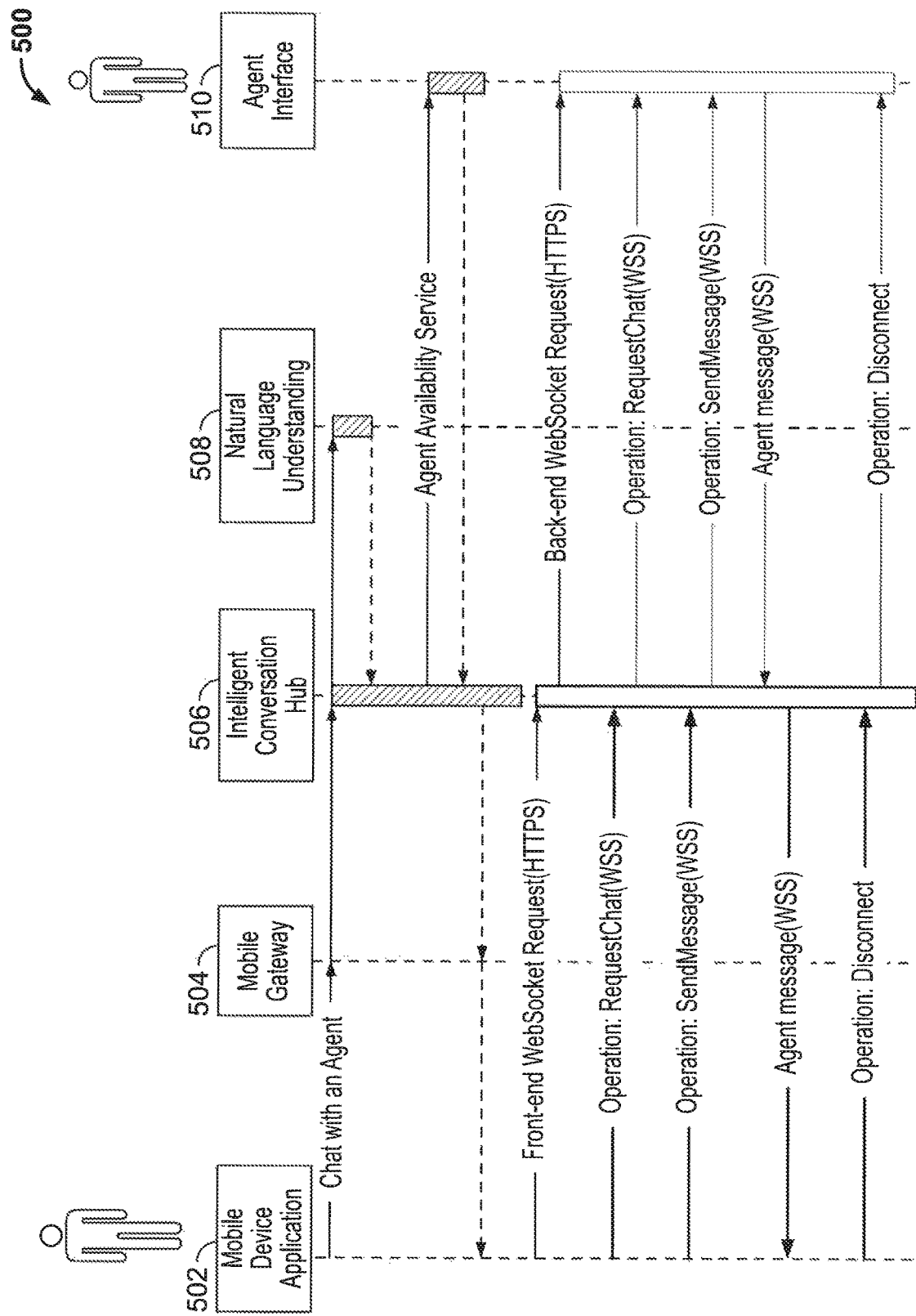
FIG. 5 shows an illustrative process flow in accordance with principles of the disclosure.

FIG. 5 shows illustrative process flow 500. Process flow 500 includes a sequence of front-end and back-end steps for connecting a user with a chatbot and transferring that interaction to live agent.

A user may interact with mobile device application 502. Interactions between mobile device application 502 and the broader system may be mediated by mobile gateway 504. Mobile gateway 504 may be an internal enterprise application that exposes web services to the mobile application. Mobile gateway 504 may provide user authentication and protection for enterprise systems.

The user may use mobile device application 502 to interact with intelligent conversation hub (ICH) 506. ICH 506 may be the front facing web application for an interactive response system such as a chatbot. ICH 506 may access natural language understanding processor 508 to determine user intent and extract entities from user inputs. For example, if a user enters "I need help with a dispute," natural language understanding 508 may understand the intent as "need assistance" and the topic/entity as "filing a dispute."

ICH 506 may receive a user request for a transfer to a live agent. ICH 506 may access an agent availability service to identify an agent at agent interface 510. Agent interface 510 may be a customer response management system such as Genesys mobile services, produced by Genesys Telecommunications Laboratory, Inc.

After identifying an agent, ICH 506 may orchestrate a protocol handshake and pass context or history of prior session activity to agent. The handshake may include a Hypertext Transfer Protocol Secure (HTTPS) request and may enable the server to handle HTTPS and WebSocket (WSS) connections on the same port. Once the connection is established, the communication may switch to WSS protocols. WSS protocols may enable interaction between a client application and a web server using a bidirectional binary protocol, which does not conform to HTTPS protocol.

Thus, methods and apparatus for TRANSFER OF AI-POWERED CONVERSATIONAL MESSAGING WITHIN A MOBILE APPLICATION are provided. Persons skilled in the art will appreciate that the present invention can be practiced by other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for integrating data from multiple communication interfaces within a user session at a mobile device application, the method comprising:
   at a first interface comprising an interactive response system:
      initiating an interaction with the mobile application;
      generating a first series of prompts in a first format;
      receiving a user request to interact with a live agent;
      capturing a history of the interaction prior to the request;
      converting the history from the first format to a second format; and
      transmitting the history to a second interface comprising an agent interface; and
   at a second interface:
      displaying the history to the agent;
      initiating an interaction with the mobile application; and
      receiving a second series of prompts in the second format, the prompts generated by the agent.

2. The method of claim 1 further comprising, at the second interface, displaying an option to toggle to a view of the history.

3. The method of claim 1, further comprising storing the first interface interaction with the mobile application in a database history table.

4. The method of claim 3, further comprising deleting the first interface interaction with the mobile application after a predetermined period of time.

5. The method of claim 1, further comprising, at the first interface:
   designating a topic of user interest;
   retrieving legacy communications regarding the topic;
   determining whether duplicative communications are included among the legacy communications and, to the extent that duplicative communications are included in the legacy communications, removing the duplicative communications from the legacy communications;
   retrieving legacy intelligence relating to historical user selections regarding the topic;
   retrieving a plurality of outcomes based on the legacy intelligence;
   forming a training set for a neural network associated with the topic, the training set based on the legacy communications, legacy intelligence, and the plurality of outcomes and delimited based on an analysis of the database;
   synthesizing the neural network, the neural network comprising a plurality of nodes, the synthesizing comprising using the training set to assign individual weights to each of the plurality of nodes;
   in response to a selection of the topic by the user, using the neural network to generate a plurality of user options related to the topic; and
   prompting the user to select one of the user options.

6. The method of claim 5, further comprising generating a priority score for each of the plurality of user options.

7. The method of claim 6, further comprising ranking the user options based on the priority score and displaying the user options based on the ranking.

8. The method of claim 5, wherein the outcomes comprise results of legacy user selections associated with the topic of user interest.

9. The method of claim 5, wherein the analysis of the database comprises:
   identifying a pre-determined number of topics of interest, each topic associated with a training set; and
   reducing the topics of interest found in the database to a pre-determined number of most-occurring topics of interest.

10. A system for integrating data from multiple computer-based communication platforms within a single user session at a mobile device application, the system comprising:
   a mobile device application configured to:
      initiate an interaction with a first platform, the first platform comprising an interactive response system;
      display a first prompt, the prompt generated at the first platform in a first format;
      in response to a request to interact with a live agent, initiate an interaction with a second platform, the second platform comprising an agent interface; and
      display a second prompt, the prompt generated by the agent at the second platform in a second format;
   a first platform configured to, in response to the request to interact with a live agent:
      capture a history of the interaction with the first platform;
      convert the history from the first format to the second format; and
      transmit the history to the second platform; and
   the second platform configured to display the history to the agent.

11. The system of claim 10, the first platform configured to store the history of the mobile device application interaction with the first platform in a database history table.

12. The system of claim 11, the first platform configured to delete the history of the mobile device application interaction with the first platform after a predetermined period of time.

13. The system of claim 10, the second platform configured to display the history of the interaction with the first platform on the same screen as a real-time display of the interaction with the second platform.

14. The system of claim 10, the first platform configured to:
   designate a topic of user interest;
   retrieve legacy communications regarding the topic;
   determine whether duplicative communications are included among the legacy communications and, to the extent that duplicative communications are included in the legacy communications, remove the duplicative communications from the legacy communications;
   retrieve legacy intelligence relating to historical user selections regarding the topic;

retrieve a plurality of outcomes based on the legacy intelligence;

form a training set for a neural network associated with the topic, the training set based on the legacy communications, legacy intelligence, and the plurality of outcomes and delimited based on an analysis of the database;

synthesize the neural network, the neural network comprising a plurality of nodes, the synthesizing comprising using the training set to assign individual weights to each of the plurality of nodes;

in response to a selection of the topic by the user, use the neural network to generate a plurality of user options related to the topic; and prompt the user to select one of the user options.

15. The system of claim 14, the first platform configured to generate a priority score for each of the plurality of user options.

16. The system of claim 14, the first platform configured to rank the user options based on the priority score and displaying the user options based on the ranking.

17. The system of claim 14, wherein the outcomes comprise results of legacy user selections associated with the topic of user interest.

18. The system of claim 14, wherein the analysis of the database comprises:

determining a pre-determined number of topics of interest, each topic associated with a training set; and reducing the topics of interest found in the database to a pre-determined number of most-occurring topics of interest.

19. A method for integrating data from multiple computer-based communication interfaces within a single user session at a mobile application, the method comprising:

at the mobile application, initiating a user session comprising:

a first prompt, the prompt generated at a first interface in a first format, the first interface comprising an interactive response system;

a user request to transfer the session to a live agent; and a second prompt, the prompt generated by the agent at a second interface in a second format;

at the first interface, in response to the request to transfer the session to a live agent:

capturing a history of the session prior to the request;

converting the history from the first format to the second format; and transmitting the history to the second interface; and at the second interface, displaying the history to the agent.

20. The method of claim 19, the second interface configured to display the history of the session prior to the request on the same screen as a real time display of session activity following the transfer request.

21. The method of claim 20, the first interface configured to store the history of the session prior to the transfer request in a database history table.

22. The method of claim 21, the first interface configured to delete the history of the session prior to the transfer request after a predetermined period of time.

* * * * *